US010650089B1

(12) United States Patent
Walker (10) Patent No.: US 10,650,089 B1
(45) Date of Patent: May 12, 2020

(54) SENTENCE PARSING CORRECTION SYSTEM

(71) Applicant: Walker Reading Technologies, Inc., Rochester, MN (US)

(72) Inventor: Randall C. Walker, Rochester, MN (US)

(73) Assignee: Walker Reading Technologies, Rochester, MN (US)

( * ) Notice: Subject to any disclaimer, the term of this patent is extended or adjusted under 35 U.S.C. 154(b) by 101 days.

(21) Appl. No.: 15/949,670

(22) Filed: Apr. 10, 2018

Related U.S. Application Data (63) Continuation-in-part of application No. 15/208,213, filed on Jul. 12, 2016, now Pat. No. 9,940,317, which
(Continued)

(51) Int. Cl.
*G06F 17/27* (2006.01)
*G06F 17/24* (2006.01)
(Continued)

(52) U.S. Cl.
CPC ............ *G06F 17/24* (2013.01); *G06F 3/0481* (2013.01); *G06F 17/212* (2013.01); *G06F 17/22* (2013.01);
(Continued)

(58) Field of Classification Search
CPC ...... G06F 17/27; G06F 17/20; G06F 17/2705; G06F 17/271; G06F 17/2715;
(Continued)

(56) References Cited

U.S. PATENT DOCUMENTS 4,864,502 A * 9/1989 Kucera ................. G06F 17/274
704/8
4,887,212 A * 12/1989 Zamora ............... G06F 17/2705
704/8
(Continued)

FOREIGN PATENT DOCUMENTS

CN 1119755 8/2003
CN 101599915 12/2009
(Continued)

OTHER PUBLICATIONS

Bird, NLTK; The Natural Language Toolkit, 2006, ACL, Proceedings of COLING/ACL on Interactive Presentation Sessions, pp. 69-72.
(Continued)

*Primary Examiner* — Lamont M Spooner
(74) *Attorney, Agent, or Firm* — Dicke, Billig & Czaja, PLLC (57) ABSTRACT

A system provides on a computer display screen, a graphical image of an initial parsing as generated by a computerized algorithm. Individual clauses are encased in expandable graphical elements that a human user can manipulate on the display screen using an input device in furtherance of improving the initial parsing. The expandable graphical elements have particular spatial and visual interrelationships in keeping with the initial text parsing, human user interactions with the expandable graphic elements captured so as to convert the human-based interactions with these graphical elements into additional machine-readable text and mark-up that can be usable for other machine-based text processes. The system, in addition to being a parsed text/editor interface, thereby functions as an intuitive, visual conduit for dynamic human-machine text analysis collaboration.

22 Claims, 5 Drawing Sheets

Related U.S. Application Data is a continuation of application No. 14/438,311, filed as application No. PCT/US2013/066635 on Oct. 24, 2013, now Pat. No. 9,390,080.

(60) Provisional application No. 61/718,553, filed on Oct. 25, 2012.

(51) Int. Cl.
*G06F 3/0481* (2013.01)
*G06F 17/22* (2006.01)
*G06F 17/21* (2006.01)

(52) U.S. Cl.
CPC ........ *G06F 17/274* (2013.01); *G06F 17/2705* (2013.01); *G06F 17/2775* (2013.01)

(58) Field of Classification Search
CPC .. G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2775
USPC .................................. 704/1, 9, 10
See application file for complete search history.

(56) References Cited

U.S. PATENT DOCUMENTS

| | | | | |
|---|---|---|---|---|
| 4,914,590 | A * | 4/1990 | Loatman | G06F 17/274 704/8 |
| 5,418,717 | A * | 5/1995 | Su | G06F 17/271 704/9 |
| 5,475,588 | A * | 12/1995 | Schabes | G06F 17/274 704/9 |
| 5,802,533 | A | 9/1998 | Walker | |
| 5,920,836 | A | 7/1999 | Gould et al. | |
| 6,279,017 | B1 | 8/2001 | Walker | |
| 6,732,098 | B1 * | 5/2004 | Wakefield | G06F 16/3344 |
| 6,738,765 | B1 * | 5/2004 | Wakefield | G06F 16/284 |
| 6,823,325 | B1 * | 11/2004 | Davies | G06F 17/271 706/50 |
| 7,027,974 | B1 * | 4/2006 | Busch | G06F 17/271 704/4 |
| 7,036,075 | B2 | 4/2006 | Walker | |
| 7,171,349 | B1 * | 1/2007 | Wakefield | G06F 16/316 704/9 |
| 7,181,438 | B1 * | 2/2007 | Szabo | G06F 21/6245 |
| 7,191,117 | B2 | 3/2007 | Kirby et al. | |
| 7,765,471 | B2 | 7/2010 | Walker | |
| 7,861,163 | B2 | 12/2010 | Walker | |
| 9,390,080 | B2 * | 7/2016 | Walker | G06F 17/212 |
| 2002/0013793 | A1 * | 1/2002 | Bergan | G06F 17/2785 715/234 |
| 2003/0043213 | A1 | 3/2003 | Finley, Jr. et al. | |
| 2003/0125929 | A1 * | 7/2003 | Bergstraesser | G06F 17/2735 704/9 |
| 2003/0182102 | A1 * | 9/2003 | Corston-Oliver | G06F 17/2881 704/9 |
| 2003/0191627 | A1 * | 10/2003 | Au | G06F 17/2785 704/9 |
| 2003/0200077 | A1 * | 10/2003 | Leacock | G09B 7/00 704/1 |
| 2004/0093220 | A1 | 5/2004 | Kirby et al. | |
| 2005/0015238 | A1 | 1/2005 | Meliksetian et al. | |
| 2005/0091036 | A1 * | 4/2005 | Shackleton | G06F 17/2705 704/9 |
| 2005/0108001 | A1 | 5/2005 | Aarskog | |
| 2006/0004826 | A1 * | 1/2006 | Zartler | G06F 17/277 |
| 2006/0184476 | A1 * | 8/2006 | Kemper | G06F 16/24522 706/20 |
| 2006/0230071 | A1 * | 10/2006 | Kass | G06Q 10/00 |
| 2007/0083359 | A1 | 4/2007 | Bender | |
| 2007/0219773 | A1 * | 9/2007 | Roux | G06F 17/27 704/1 |
| 2007/0294644 | A1 | 12/2007 | Yost | |
| 2008/0195379 | A1 * | 8/2008 | Vanderwold | G06F 17/274 704/9 |
| 2008/0221869 | A1 * | 9/2008 | Johnson | G06F 17/271 704/9 |
| 2010/0198592 | A1 * | 8/2010 | Potter | G10L 15/1822 704/233 |
| 2010/0281385 | A1 | 11/2010 | Meaney et al. | |
| 2011/0307435 | A1 * | 12/2011 | Overell | G06F 17/278 706/46 |
| 2012/0078906 | A1 * | 3/2012 | Anand | G06Q 10/06 707/737 |
| 2012/0272206 | A1 * | 10/2012 | Sengupta | G06F 17/2705 717/101 |
| 2012/0290288 | A1 * | 11/2012 | Ait-Mokhtar | G06F 17/271 704/9 |
| 2013/0021346 | A1 * | 1/2013 | Terman | G09B 5/08 345/467 |

FOREIGN PATENT DOCUMENTS

| | | |
|---|---|---|
| CN | 101661494 | 3/2010 |
| CN | 102354318 | 2/2012 |

OTHER PUBLICATIONS

The first Chinese Office Action for Chinese Serial No. 201380066610.5 dated Feb. 28, 2017; 6 pages.
International Search Report and Written Opinion from PCT/US2013/066635; 9 pages; Lee W. Young; dated May 1, 2014.
International Preliminary Report on Patentability from PCT/US2013/066635; 20 pages; Richemond Dorvil; dated Oct. 30, 2014.

* cited by examiner

SENTENCE PARSING CORRECTION SYSTEM

This application is a continuation-in-part of U.S. patent application Ser. No. 15/208,213 filed Jul. 12, 2016 which in turn is a continuation of patent application Ser. No. 14/438,311 filed Apr. 24, 2015, a national phase election of Patent Cooperation Treaty application Ser. No. PCT/US2013/066635 filed Oct. 24, 2013, an application filed under 35 U.S.C. § 120 and 37 CFR § 53(b) claiming priority, under 35 U.S.C. § 119(e)(1), of provisional application Ser. No. 61/718,553, filed on Oct. 25, 2012 and incorporated herein by reference in its entirety.

TECHNICAL FIELD

The present invention is generally directed to a machine implemented parsing system, more particularly, to a sentence parsing correction system, and more particularly still, to a sentence parsing correction system characterized by a viewable graphical interface, the interface subject of select human user intervention whereby renewed spatially coordinated related graphical elements are established, the relationships thereof and there between advantageously memorialized into hierarchical machine readable mark-up code.

BACKGROUND OF THE INVENTION

Automated sentence parsing has many purposes, from translation from one language to another, to voice recognition. "Parsing" involves dividing a sentence into its constituent phrases: noun phrases, verb phrases, and prepositional phrases. One definition of a phrase is a group of one or more words that form a constituent and so function as a single unit in the syntax of a sentence. A phrase will always include the title part of speech, and often other words as well. Any phrase can in general include other phrases, i.e., nested phrases.

Phrases may be combined into clauses. One or more clauses may be combined into a sentence. A sentence can be defined in orthographic terms alone, i.e., as anything which is contained between a capital letter and a period. A clause may or may not include a noun, a verb, and an object, elements usually, but not always, characteristic of a sentence.

A particular issue in such parsing is resolving ambiguities. Consider the sentence "The little old lady angrily hit the thief with her purse." This sentence could mean "The little old lady used her purse to angrily hit the thief," or it could mean "The little old lady angrily hit the thief that had her purse." These of course are very different meanings.

Automated parsing cannot at this time, easily resolve these ambiguities. Indeed, even a human cannot always do so, although by referencing adjacent sentences or even the entire text, a human may often be able to make an educated, very accurate guess.

If the previous sentence to the one above had been, for example, "An old lady was walking down the street carrying a baseball bat and her purse," a human will accurately assume that the old lady hit the thief with the baseball bat. On the other hand, if the trailing sentence read "The thief fell to the ground and the old lady walked on, never having lost her purse," then it's safe to assume that she had hit the thief with her purse.

Systems described in Applicant's prior patents use algorithms that produce quite accurate parsing. These patents include U.S. Pat. Nos. 5,802,533; 6,279,017; 7,036,075; 7,765,471; and, 7,861,163, each of which is incorporated herein by reference in their entireties.

Applicant's disclosed algorithms produce hierarchical lists that parse each sentence in the text by their constituent clauses. In cases where it is important to parse the sentences very accurately, and it is possible to delay the final listing to allow human input to correct any possible errors, these lists can be corrected by direct human editing. If the parsing is part of a system for real time translation for example, then human input is not possible.

The hierarchical lists may be quite complex. In common with all text-based presentations of information, such lists are easy to misunderstand, and difficult to accurately review for error. A human reviewing such lists will typically lose focus after a time, and either fail to accurately correct a list having an error, or even miss the error completely. Accordingly, a system that displays the sentence structures in a way that is more graphical and less textual may well allow more accurate correction of such lists. Moreover, such system may be readily adapted so as to capture and convert human user based interactions with graphical elements into additional machine-readable text and mark-up that may be suitably and advantageously used for other machine-based test processes. Further still, it is contemplated that such system, or a readily adapted version thereof, in addition to being an especially effective parsed text/editor interface, enables a new reading and document building format, with numerous options for individual human user customizations, multimodal inputs/outputs and text editing, with mediation of the fusion if graphic an prosodic structures for the analysis and representation of syntax.

BRIEF DESCRIPTION OF THE INVENTION

A system for improved sentence parsing is generally characterized by a computer/computer processor, a display screen receiving display signals from the computer forming a plurality of display objects on the screen and a cursor image on the screen, and a cursor control element for control by a user. The cursor control element may be a discrete element such as a computer mouse which is operably linked to system elements to effectuate cursor control, or the cursor control element may be part-and-parcel of the display, user manipulations with respect thereto via a pointer, wand or even finger suitably selectively directing a cursor or other displayed image/content as the case may be.

The cursor control element provides a cursor control signal to the computer specifying the position of the cursor on the screen, and a cursor action signal having attach and detach states allowing a user to respectively attach an underlying object to the cursor and to detach the cursor from the underlying object. The object is movable with the cursor during the attach state of the cursor action signal. Detaching the object from the cursor responsive to the detach state of the cursor control signal drops the underlying object in the current position.

The computer receives an input sentence signal encoding the characters comprising a sentence, and provides, according to a preselected parsing algorithm, an initial parsed sentence signal encoding an initial parsed version of the noun, verb, and prepositional phrases of the sentence. In some instances however, the initial parsed version is not sufficiently accurate. The invention provides a means to assist a proofreader in addressing this.

The computer first configures as a display element receiving the initial parsed sentence signal, and produces a parsed image display signal for the display screen. The parsed image display signal created on the display screen shows the sentence text arranged in original order, and having on successive lines, the noun, verb, and prepositional phrases of the sentence with indentations or horizontal offsets specifying the relationships among them.

The computer then configures as a format element receiving the parsed sentence signal that creates an image (e.g., graphic element) for each phrase in the sentence, an expandable container (excon) image. Each of these images includes the phrase and a decoration unique to that phrase. The format element then encodes the excon images in an excon format signal defining the shape of each excon image and an initial topologic relationship of each excon image to the other excon images specifying the initial parsing.

Finally, the computer configures as a correction element receiving the excon format signal and the cursor control and action signals, and responsive thereto attaches the cursor to an excon image. The user then manipulates the cursor control element to move the cursor and the excon image.

Once the excon image is positioned as the user wishes, the user detaches the cursor from the excon image, leaving the excon image at the desired location. While the cursor moves, the correction element provides a display signal creating an image following the attaching, moving, and detaching activities. Responsive to the change from the attach to the detach state of the cursor action signal, the correction element produces a final parsed image display signal creating on the display screen a final topologic relationship of each excon image to the other excon images specifying the altered parsing. The sentence text encoded in the final parsed image display signal has on successive lines, the noun, verb, and prepositional phrases of the sentence with indentations indicating the final parsing.

The decoration in this system may comprise a pattern within the excon through which the phrase is visible. For example, the pattern may comprise lines visible on the display screen. Each line within an excon image may be of a similar type and spaced from the other lines within that excon image. The lines within at least one excon image may be solid, and the lines within another excon image may be dashed.

The format element preferably includes a line merge element, wherein an area on the display screen defined by two overlapping excon images, displays the lines unique to the two overlapping excon images.

In another version, the decoration comprises a color through which the phrase is readable. The format element in this version preferably includes a color merge element, wherein an area on the display screen defined by two overlapping excon images, displays a color different from the colors unique to the two overlapping excon images. The color in the area on the display screen defined by two overlapping excon images, may have a spectral relationship to each of the colors in the two overlapping excon images.

The correction element may be of the type that issues a signal specifying the indentation of the text within an excon image attached to the cursor responsive to the detach state of the signal. The correction element may issue a display signal that changes the dimensions of at least one excon image responsive to the cursor control and action signals.

The computer may further configure as a conversion element receiving the final parsed image display signal and converting same into sets of mark-up tags in a linear text listing for the original sentence. The conversion element then encodes the sets of mark-up tags into a final meta-tag listing signal.

A further system for improved sentence parsing is contemplated and provided wherein a machine generated parsing output, corresponding to a sentence characterized by components comprising a noun, a verb and a prepositional phrase and originating from a meta-tag listing of/for same, is adapted and subject to human user assessment and select human user input in furtherance of effectuating a modification to the adapted machine generated parsing output. The human user modified adapted machine generated parsing output is thereafter converted into a correspondingly renewed meta-tag listing of meta-tags of the originating meta-tag listing and renewed machine parsing undertaken in furtherance of an adapted parsing functionality for the system.

The system includes a computer processor, a display device operatively linked thereto, and a human user action element to effectuate select user actions in relation to display objects of the display device, The computer processor is characterized by functional units, a first functional unit establishing, in keeping with a preselect parsing algorithm, the machine generated parsing output corresponding to the sentence characterized by components comprising a noun, a verb and a prepositional phrase, the output characterized by an initial display on the display device. The initial display is characterized by the text of the sentence arranged in original text order, and having, on successive lines, the noun, the verb, and prepositional phrase of the sentence with relative indentations specifying parsing relationships among parsed components, A second functional unit establishes an adapted initial display for display upon the display device, the adapted display characterized by unique expandable container images, each parsed component enclosed within a unique expandable container image of the unique expandable container images, each of the unique expandable container images of the adapted initial display subject to select human user input via the human user action element, the modification to the adapted machine generated parsing output thereby effectuated.

Select human user action may be effectuated via a mouse, trackball, touchscreen, etc., with select human user input further comprising selecting word combinations of a parsed sentence component enclosed within a unique expandable container image for enclosure within a further unique expandable container image, the word combinations thereby having a new and consistent treatment relative to re-parsing and/or subsequent parsing. Moreover, select user input, relative to a select expandable container image, initiates a recalculated parsing of the sentence while preserving localized syntactic inter-relationships specified via the select human user input relative to a select expandable container image.

The system may advantageously be characterized by an input device operatively linked to one or more of the computer processor, the display device and the human user action element. The input device permits select user formatting of a text characterized by the modified adapted machine generated parsing output, the text displayable upon the display device. The input device alternately or further permits select human input comprised of select reading aloud a sentence intended for modification with a first vocal emphasis, and a select re-reading aloud of the modified sentence with a second vocal emphasis. The two reading are thereafter machine analyzable and correlatable with later encountered sentences of a text.

In addition to an input device, the system may advantageously include an output device operatively linked to one or more of the computer processor, the display device and the human user action element. Input to the input device activates the output device in furtherance of reinforcing the modification to the adapted machine generated parsing output. The output device alternately or further provides a supplementary user perceptible effect comprised of a visual, acoustic or tactile user perceptible effect. The supplementary user perceptible effect is effectuated upon or response to select human user input relative to a select expandable container image.

Finally, the system may be advantageously characterized by a machine learning algorithm executable by the computer processor. The machine learning algorithm captures and analyzes human user input relative to each of the unique expandable container images of the adapted initial display resulting in the modification to the adapted machine generated parsing output thereby effectuated. More specific features and advantages obtained in view of those features will become apparent with reference to the drawing figures and DETAILED DESCRIPTION OF THE PREFERRED EMBODIMENTS.

DESCRIPTION OF THE PREFERRED EMBODIMENTS

Figure 1:
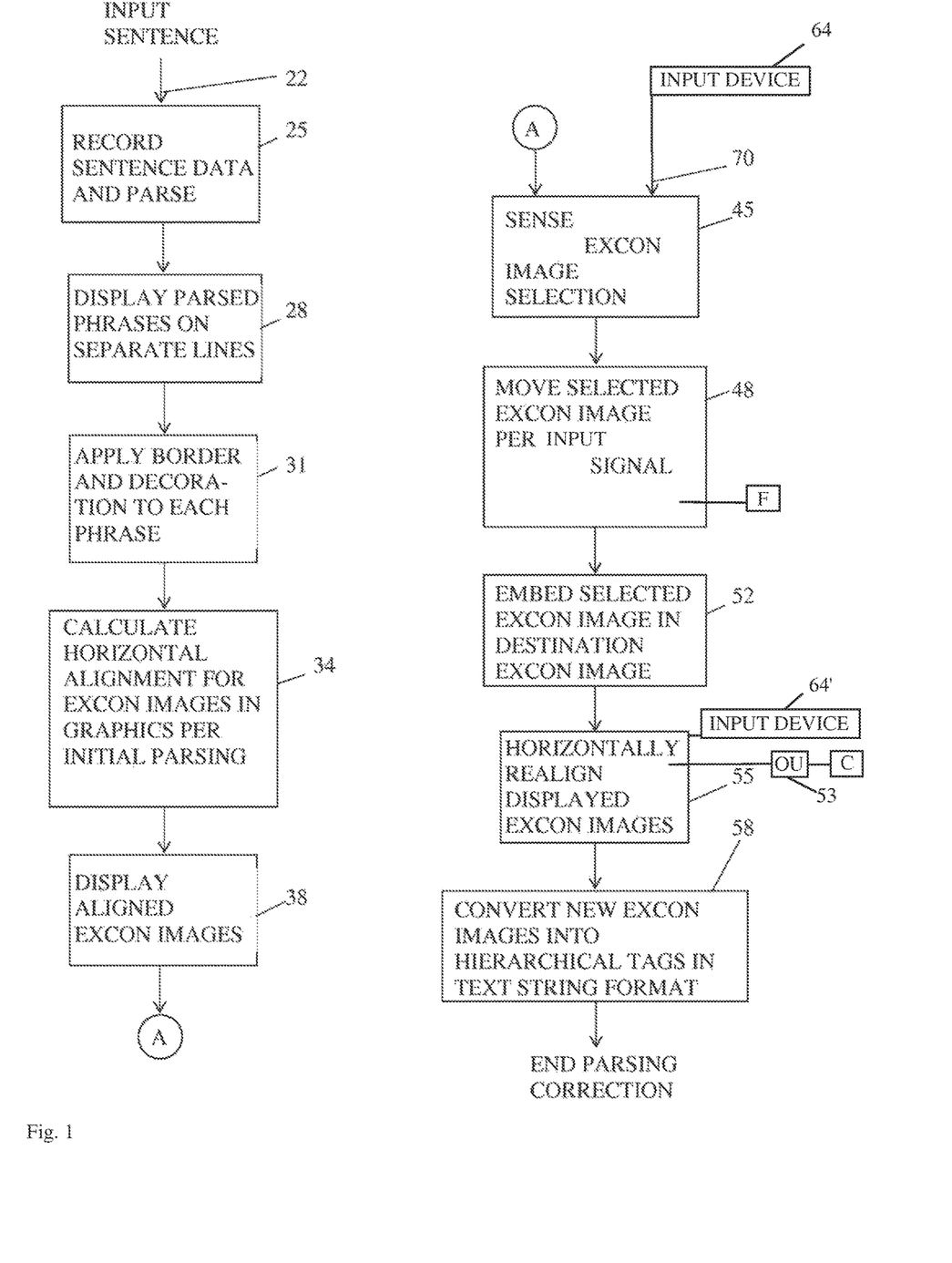
FIG. 1 is a block diagram of functional elements that comprises the invention.

FIG. 1 shows a block diagram of a system 10 that a user employs to a corrected graphical image of a parsed sentence. The intent is to allow a user to arrange and rearrange individual phrases after machine parsing to more accurately reflect the intended meaning of the sentence without altering the original order of the sentence phrases.

FIGS. 2-5 show a display screen 30 forming a part of system 10. FIGS. 2-5 show a series of images that represent screen captures for a system 10 that embodies the invention.

System 10 includes a computer 67 characterized by a processor P, that provides video signals to display screen 30. A mechanism to control a position of a cursor depicted on the display screen, or to control/manipulate displayed screen images/content, is further provided, i.e., cursor control element, e.g., a computer mouse, trackball, etc. 64 as indicated (note FIGS. 4 & 5). That said, in lieu of indirect means to position a cursor relative to a display screen, and/or otherwise manipulate displayed screen images/content, direct means via tools intended for cooperative engagement upon a touch-screen of a display device or the like are likewise contemplated.

A memory element 75 of computer 67 receives input data signals and records the data encoded therein under control of software. Recorded data can be retrieved in output data signals. All of these components are conventional. Moreover, computer 67 includes or may include other components (e.g., peripherals) conventionally found in modern computing devices (e.g., personal computers (desk top, lap top), tablets, handhelds, smart phones, etc.). Components such as a keyboard and hardware/software to support/enable communication with external devices.

Screen 30 in FIGS. 2-5 displays images of typical screen captures showing how the system 10 responds as a user corrects an original machine parsing. In this discussion it is convenient to use the same ambiguous sentence discussed in the BACKGROUND section: "The old little lady angrily hit the thief with her purse."

In FIG. 1, a sentence to be parsed is encoded in an initial sentence signal carried on signal path 22. Sources for this signal might include a keyboard connected to computer 67, an external memory that has previously recorded or otherwise captured text to be parsed, etc.

A functional element 25 records the sentence encoded in the signal on path 22 in memory element 75. Element 25 then proceeds to parse the phrases in the sentence. The eventual result of this parsing might be an initial meta-tag listing as follows:

Meta-Tag Listing 1

<S><N>P1_The little old lady</NP><VP><V1>P2_angrily hit</V1><NP>P3_the thief><PP>P5_with her purse</PP></NP></VP>.</S>

Computer 67 (FIG. 2) generates a signal storing this initial parsing string in memory 75. In the initial parsing string, the individual tags have the following meanings: <XX> and </XX>;—starting and finishing separators for a parsing tag; S—start of a sentence; N—noun; P1, P2, etc.—phrase indicator; VP—verb phrase; PP—prepositional phrase; and, /—end of the indicated character string In connection to horizontal positioning, functional element 28 receives an input sentence signal encoding the characters comprising a sentence, and providing, according to a preselected parsing algorithm, a parsed sentence signal encoding a parsed version of the noun, verb, and prepositional phrases of the sentence. Initial layout designation for the position of the first word of each phrase might be as follows: add two spaces for a new equal hierarchy, e.g., noun and verb of same phrase; add three spaces for each hierarchical level tag within another hierarchy; and, when multiple equivalent hierarchies exist within a larger hierarchy, start with the most distal segment and add two spaces for each proximal segment, with such processing producing the following hierarchical meta-tag listing for the example sentence:

TABLE 1

| | Horiz. Offset | Phrase | |
|---|---|---|---|
| <S> | | | |
| <NP>P1_ | (x=1) | The little old lady | </NP> |
| <VP>P2_ | (1+2=3) | angrily hit | |
| <VP-NP>P3_ | (1+2+3=6) | the thief | |
| <VP-NP-PP>P4_ | (1+2+3+3=9) | with her purse. | |
| </PP> </NP> </V> </S>. | | | |

The horizontal offsets (i.e., indentations) are determined by assigning each noun phrase (NP) an offset of 1, and each verb phrase and prepositional phrase an offset of 3. The values for these horizontal offsets in Table 1 correspond to the columns (i.e., values for x) in which the first letter of the first word of the phrase is placed in FIG. 2. These offsets are cumulative. The purpose of this arrangement is to provide the user with clearer access to the individual phrases. The display 30 (FIG. 2) reflects this organization, with the individual phrases indicated as 33, 36, 39, and 42. Note that the horizontal offset of each phrase's beginning letter corresponds to the horizontal offset indicated above.

Figure 2:
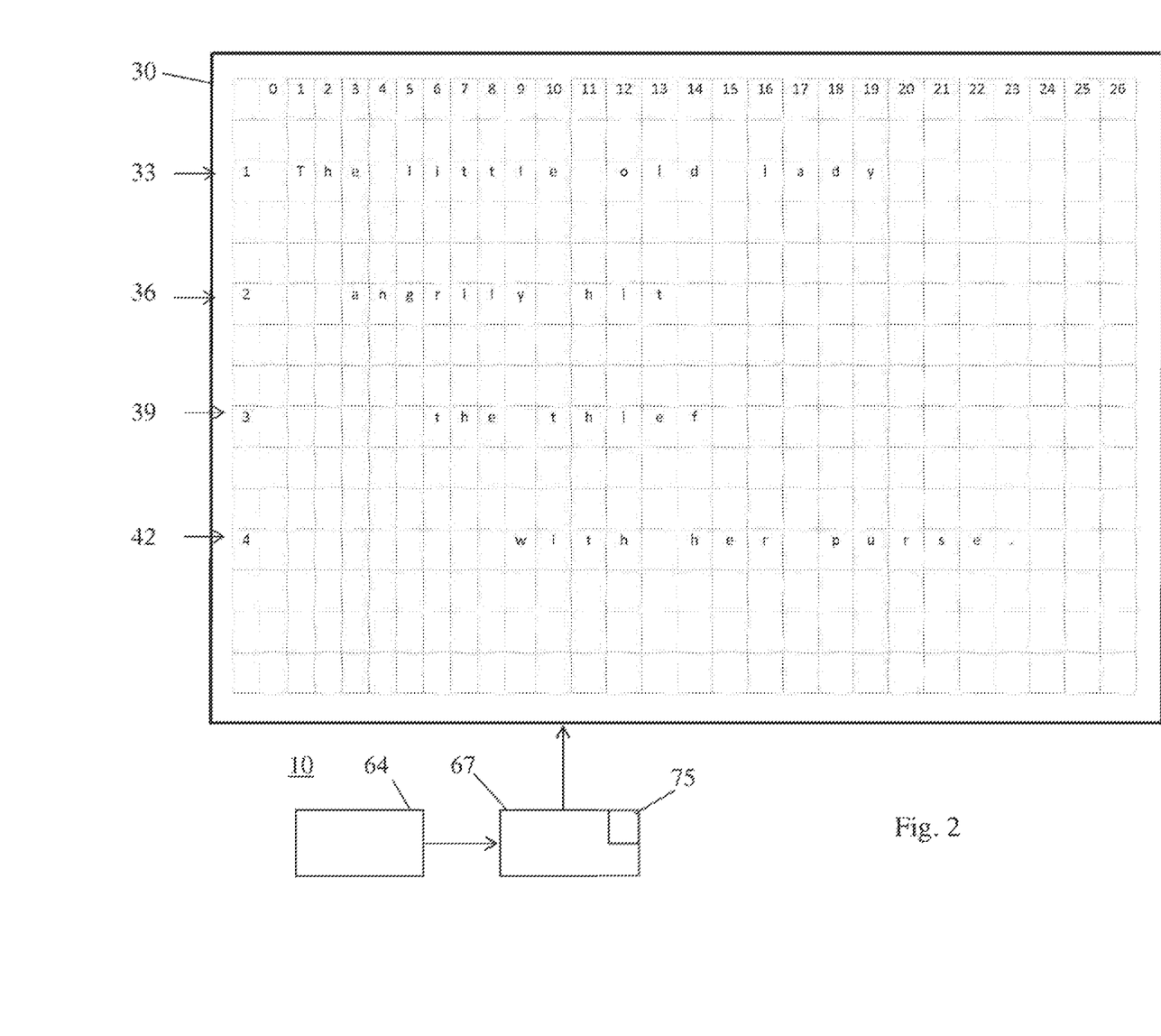
FIG. 2 is a computer system schematic, an initial parsing of a sample sentence shown on a display of the system thereof.

Functional element 31 receives the signal encoding the screen pattern of FIG. 2 and creates closed containers 47, 51, 54, and 57 (FIG. 3) enclosing the individual phrases texts 33, 36, 39, and 42 respectively. Containers 47, 51, 54, and 57 are similar to rectangles that users can create using any drawing software such as that forming a part of MICROSOFT® software suite, namely, "Word." The software automatically expands or resizes these containers so as to accommodate multiple phrases as the user shifts containers into or out of other containers, in a way similar to that for changing the size of objects with common drawing software. It is convenient to use a shorthand term of "excon image" or simply "excon" to refer to these expandable or resizable text containers. While not shown on screen 30, it should be understood that each sentence that undergoes this alteration is placed within the text from which it originally was selected. This allows a user to quickly grasp the context for the sentence while reviewing the initial parsing for accuracy.

Display screen 30 receives display signals from the computer 67 to effectuate the display of the excon images 47, 51, 54, and 57, and a cursor image 61 thereon. A cursor control element such as, but not limited to, mouse 64 may be used for user control of the cursor. As a user manipulates it, the mouse provides a cursor control signal to the computer 67 specifying the position of the cursor image 61.

The mouse also has a button on it under control of the user, that provides a cursor action signal having attach and detach states to attach and release the cursor image 61 to an object such as one of the excon images 47, 51, 54, and 57 underlying the cursor image 61. The underlying excon 47, 51, 54, and 57 is movable with the cursor image 61 as specified by the cursor control signal during the attach state of the cursor action signal. The detach state of the cursor action signal releases the excon image 47, 51, 54, and 57 in its current position.

A user can thus change positions of the excon images 47, 51, 54, and 57 using the mouse, and the button on it, to control cursor 61 (see FIGS. 4 & 5), or via user interface with a display comprised of a touch screen or the like, which attaches to the excon image involved. In the same way, a user can change the size of an excon image 47, 51, 54, and 57 to accommodate more, or fewer, phrases as a user wishes.

It is also convenient to give excon images 47, 51, 54, and 57 a wallpaper or background pattern (i.e., a decoration), to assist a user when rearranging the containers during parsing correction. In the system shown, the decorations comprise parallel diagonal lines of various types so as to distinguish overlapping or overlying of some containers on others. The patterns should have transparency so that the text and wallpaper patterns are discernable regardless of the number of overlying containers in a particular area.

Figure 3:
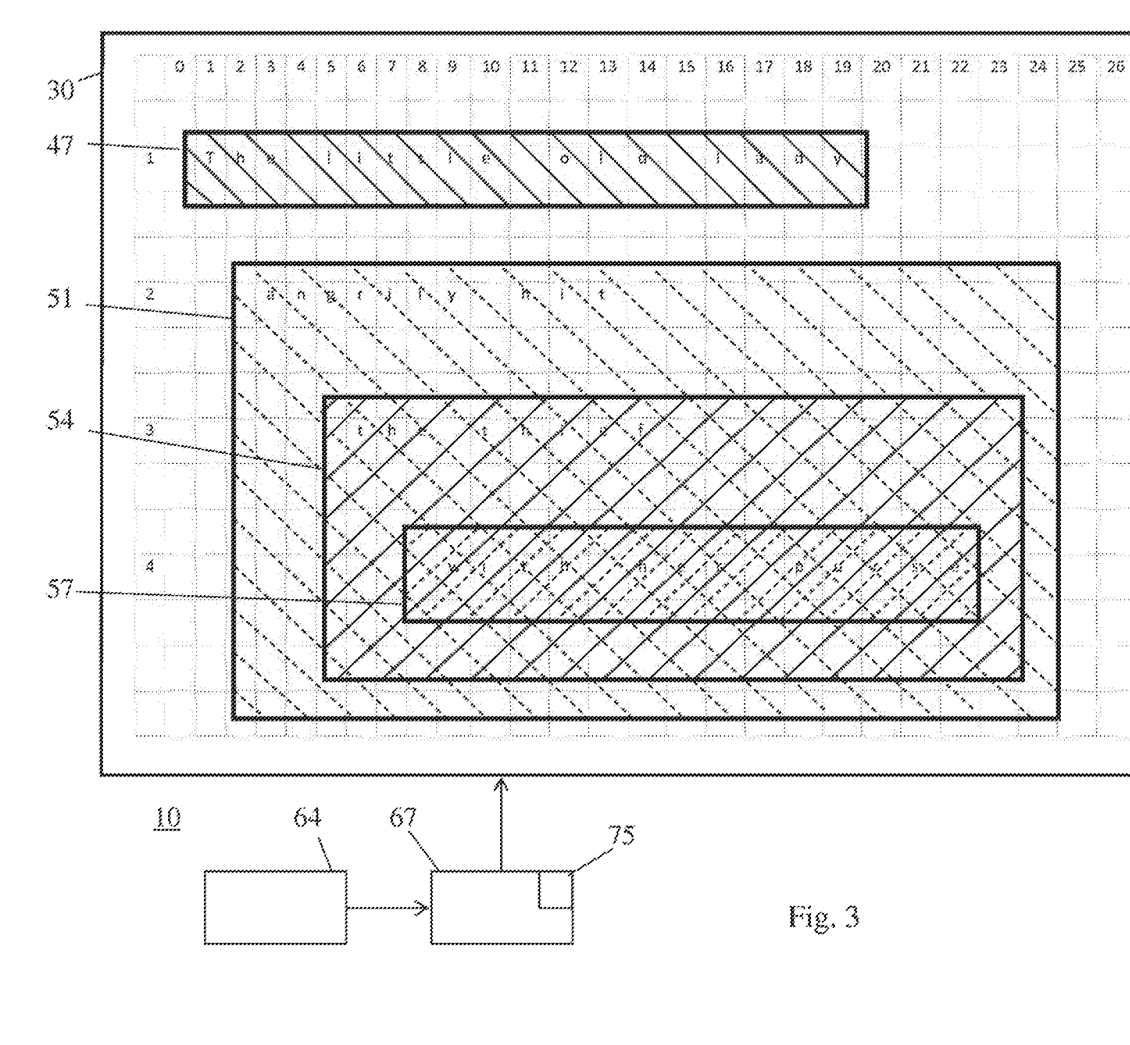
FIG. 3 depicts the computer system schematic of FIG. 2, the display showing an initial stage of improving the parsing of the sample sentence using the invention as an aid.

Referring to FIG. 3, one can see that excon image 57 has southwest to northeast dotted line diagonals overlying the southwest to northeast solid line diagonals of excon image 54 and the northwest to southeast dotted line diagonals of excon image 51. The transparency feature of each container's background pattern allows the other excons' patterns and the text within them to be clearly visible. At the same time, each pattern is easily associated with its excon images 47, 51, 54, or 57.

In another version, the decorations may have various distinctive colors. The computer 67 may comprise a color merging element causing individual colors within individual excon images to blend or merge to create other distinctive colors that a user will quickly learn to identify as having a particular meaning. One can in fact, consider the individual line patterns as proxies for color fills or patterns. The color fills should in the coloration version as well, have transparency sufficient to allow the user to see the text held within the excon involved. Of course, both colors and line patterns can be present simultaneously within a particular excon.

In one version, the colors for colored overlapping excon images blend to create a new color spectrally related to the colors in the two overlapping images. The line patterns where excon images 54 and 57 overlap for example, symbolize such a spectral relationship.

Functional element 34 receives the signals defining the excon images 47, 51, 54, and 57 from functional element 31 and computes the appropriate horizontal offsets for the phrases as per TABLE 1. Element 34 then transmits a signal encoding these offsets to a functional element 38. Functional element 38 processes the offset signal and transmits a positioning signal to the display screen 30 that properly aligns the individual excon images 47, 51, 54, and 57.

Functional element 38 activates functional element 45. As the user shifts the position of the mouse and presses its control buttons, user input operation signal or signals 70 pass to element 45 which then transmits these signals to screen 30. These signals cause the position of cursor 61 (FIGS. 4 & 5) to shift in accordance with the mouse movement.

In connection to parsing correction, functional element 48 allows the user to use a mouse button to lock cursor onto an excon image 47, 51, 54, or 57 and then shift the excon image as the user desires. Such approach is not unlike grabbing and shifting the position of any displayed object under control of a computer operating system.

Figure 4:
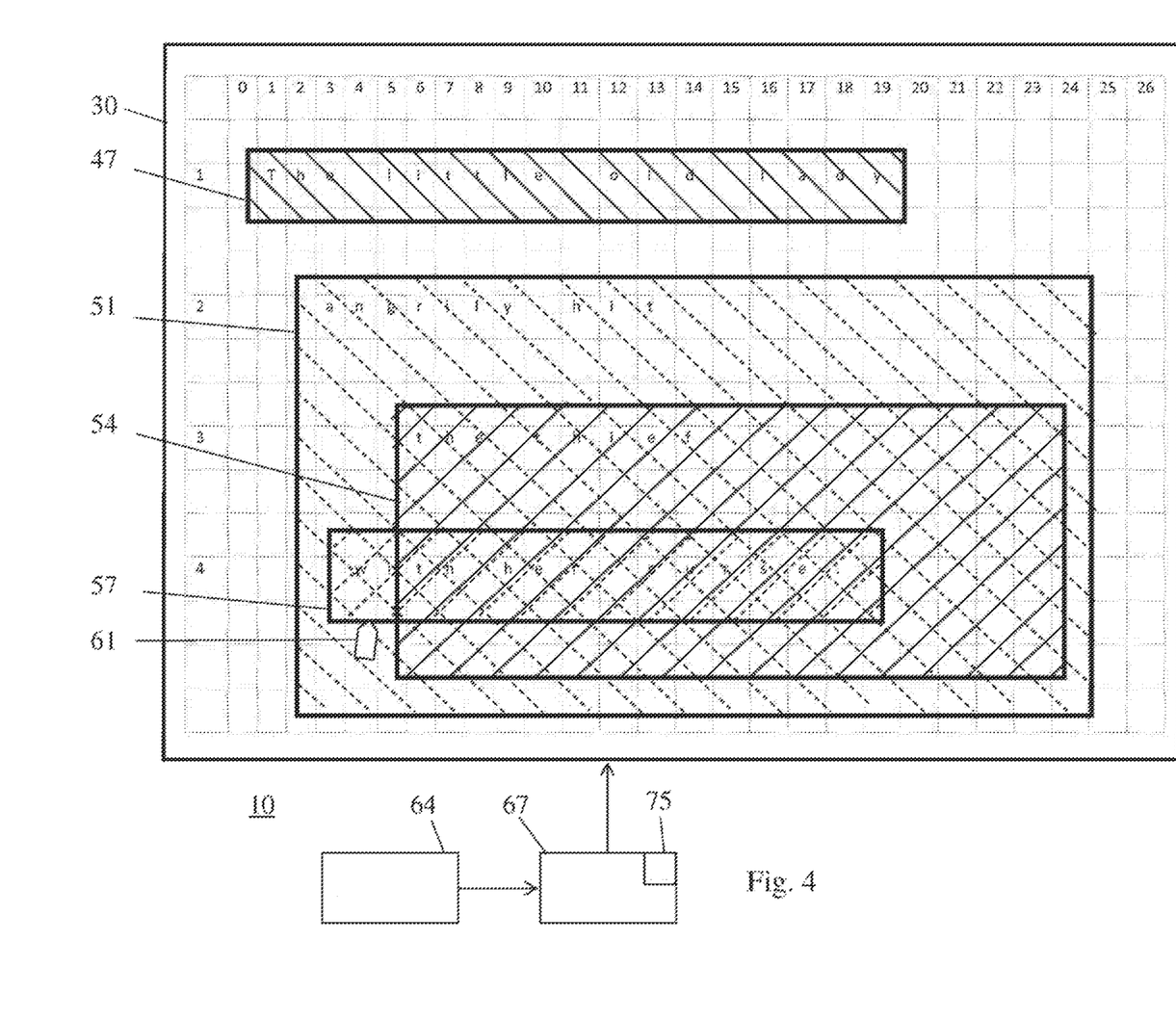
FIG. 4 depicts the computer system schematic of FIG. 2, the display showing a further, intermediate stage of improving the parsing of the sample sentence using the invention as an aid; and, FIG. 5 depicts the computer system schematic of FIG. 2, the display showing an altered (improved) parsing of the sample sentence using the invention as an aid.

Referring to FIG. 4, the user has locked cursor 61 onto excon image 57 by operative engagement of the mouse to issue the cursor action signal with the attach state in furtherance of removing or extracting excon image 57 from excon image 54. Note that the decoration for excon image 57 that is outside of excon image 54 is different from that inside excon image 54.

Figure 5:
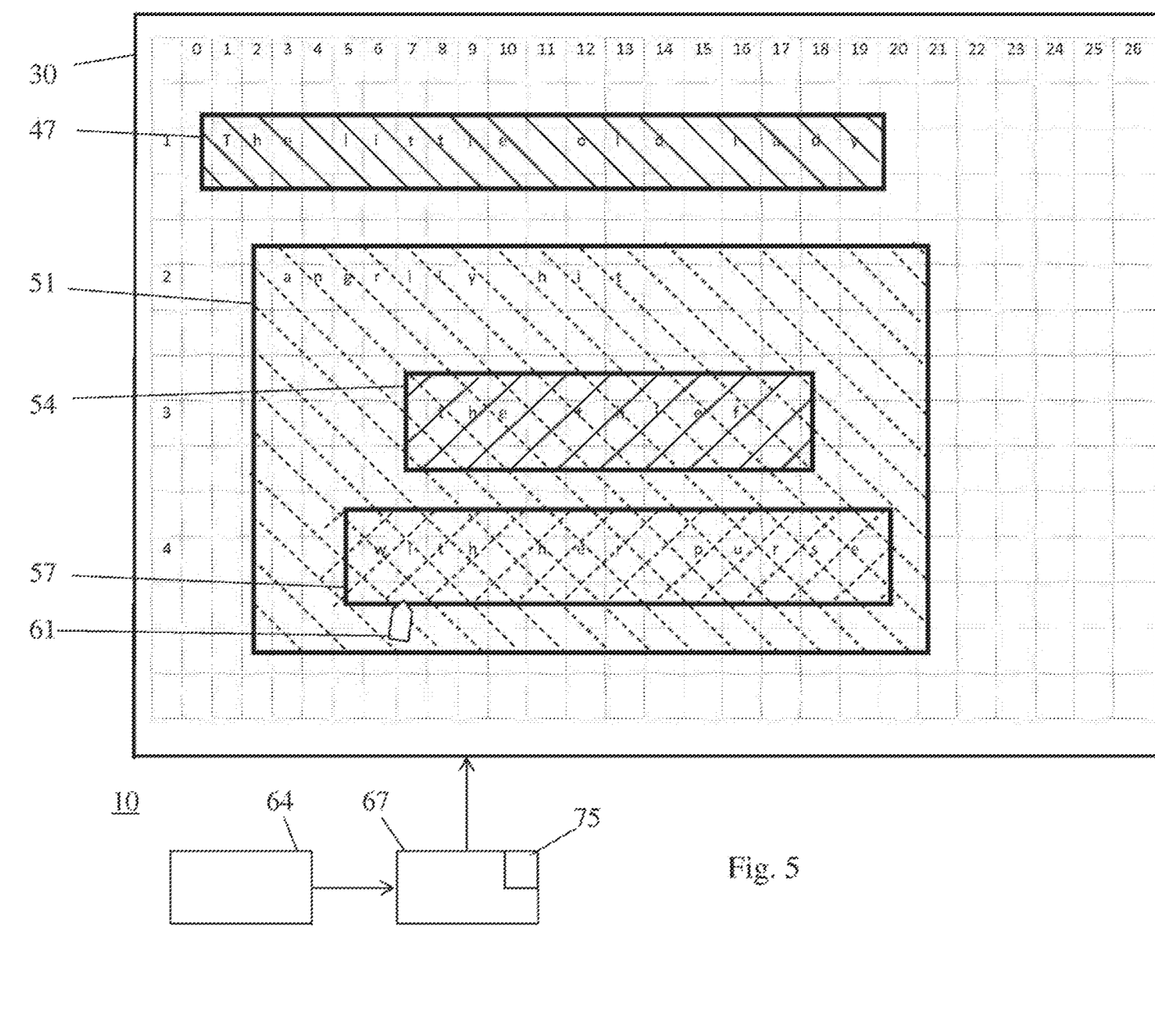

In one embodiment, when the user moves an excon image that is enclosed by another excon image partially outside of the enclosing excon image, the enclosing excon image automatically resizes by contracting. Thus, the user can move excon image 57 entirely outside of excon image 54 and place excon image 57 within excon image 51 (FIG. 5). In one embodiment, moving excon image 57 partially outside excon image 54 causes excon image 54 to resize by contracting (vertically), to thereby create space for excon image 57 within excon 51, as shown in FIG. 5.

Functional element 48 derives a signal encoding the new position of excon image 57 from the mouse signals during cursor 61 movement. When the user releases the mouse button that attached cursor 61 onto excon image 57, the cursor action signal returns to the detach state. Excon image 57 then remains in the position Functional element 52 then resizes excon images 51 and 54 to make room for excon image 57 as per FIG. 5. Functional element 55 also responds to the detach state of the cursor action signal, and the new parsing arrangement, to recalculate a new horizontal (offset) alignment for the texts in excon images 54 and 57.

After repositioning and resizing of excons 54 and 57, screen 30 displays a parsing as (presumably) improved by the user, and issues a final parsing signal encoding the new arrangement. The display of excon 57 outside of the excon 54 and in horizontal alignment between excons 51 and 54 symbolizes the meaning of the sentence that the user determines to be more proper. Functional element 58 receives the final parsing signal and converts the new parsing arrangement that the excon images represent into a correspondingly renewed meta-tag listing of the meta-tags, horizontal offsets and phrases shown TABLE 2 wherein the values for the horizontal offsets correspond to the column (i.e., values for x) in which the first letter of the first word of the phrase, inside the excon, is placed (FIG. 5):

TABLE 2

|  | Horiz. Offset | Phrase |  |
| --- | --- | --- | --- |
| <S> | | | |
| <NP>P1_ | (x=1) | The little old lady | </NP> |
| <VP>P2_ | (1+2=3) | angrily hit | |
| <VP-NP>P3_ | (1+2+4=7) | the thief | </NP> |
| <VP-PP>P4_ | (1+2+4−2=5) | with her purse. | |
| </PP> </V> </S>. | | | |

The x-value for P4 now shows (1+2+4−2=5) to denote that P4 has been moved to the left of P3, and that the horizontal offset of P4 is now 2 columns less than the horizontal offset for P3. The FIG. 5 display also reflects a slight shift in the x-value of P3 (=7), compared to its FIG. 2 position/value where it had been =6); this is the result of rules in the excon positioning algorithm, in which an excon that has had one of its internal excons taken out of it, such as the excon for P4 being pulled out of the excon for P3, will automatically add an extra column value to the excon that had previously been containing the other, bumping it over to the right slightly. This adds more spatial differentiation to the layout, for greater clarity in the user's inspection of column assignments of each phrase-head.

Functional element 58 then converts the renewed hierarchical representation of TABLE 2 into a corresponding, resultant renewed meta-tag listing, with revised hierarchical tags in keeping with the TABLE 2 offsets as follows:

Meta-Tag Listing 2

<S><NP>P1_The little old lady</NP><VP><V1>P2_angrily hit</V1><NP>P3_the thief></NP><PP>P5_with her purse</PP></VP>.</S>

This listing is then encoded in a final meta-tag listing signal and supplied for further processing to the parsing system of which this invention forms a part. The final meta-tag listing signal may be used for such things as improved translation and voice synthesization. This tool is also useful in assisting an editor or proofreader in detecting potential ambiguities and faulty syntax, which the author or editor may then correct.

In light of the disclosure to this point, it should be readily appreciated that the contemplated sentence parsing correction system creates a graphical interface for human interpretation and, as needed, correction of machine-generated sentence parsing output, converting the human's alternately or newly positioned graphical elements (i.e., excons), more particularly, spatial coordinates for, among, and/or between the excons, into a renewed hierarchical mark-up code that is machine-readable. In as much as the renewed hierarchical code may be an end in itself, the system functionality heretofore described and/or show (i.e., enabling the human reader to intuitively manipulate spatial objects on the computer display in order to generate text-based, machine-readable mark-up for revised/corrected syntactic representation of the sentence) facilitates and/or enables a variety of other desirable and advantageous system outcomes.

As will subsequently presented, the renewed hierarchical code may advantageously be a link in the formation of a chain of machine learning that greatly improves subsequent initial machine parsing performance, by way of, for example, accuracy. Moreover, via one or more system adaptations, an enhanced and or targeted user experience may be achieved, either alone (i.e., for the sake of the user/reader), or in the context of further link establishment in the context of the chain of machine learning. Particulars as to exemplars of the former follow particulars as to exemplars so to the latter.

As should be readily appreciated, the nature or character of contemplated input and/or output signals may be varied and variable. Descriptions have been heretofore provided in respect of a cursor, text characters and excons on the screen for the input and display of human interactions with the text. Further contemplated supplementary or alternate inputs 70 relative to functional element 45 (FIG. 1) include, but are not limited to using finger-swipes, e.g., sequential or patterned, on a touch-screen of a display device of a contemplated sentence parsing correction system, or varying the pressure, or the number of taps, or the combination of two or more finger taps on the screen, as ways of signaling into the system certain effects, such as changing the displayed part of speech of an excon from a noun-phrase to a verb-phrase.

Similarly, the output of the contemplated sentence parsing correction system can supplementary or alternately include additional user perceivable effects, i.e., those beyond the visual boundaries and decorations of the previously described excons), to represent the effects of the human interaction with the sentence display. For example, and without limitation, if the human user is attempting to place an excon X into another excon, excon Y, but the syntactic rules of the system preclude this type of relationship, the contemplated sentence parsing correction system, owing to monitoring and pre-testing the action result, can give an audio signal, or a vibrating tactile effect, e.g., that common of "ringing" handheld devices in "silent" mode or the like, indicating that the attempted action is/may prohibited owing to human-based error that would likely result in an inaccurate parsing interpretation (i.e., violative of established parsing and/or syntactic rules/criteria). In this scenario, the output takes the form of a processing flag F, and in the described scenario, a processing flag associated with functional element 48 operations as shown FIG. 1. Beyond in-process output signaling as contemplated and described, alternate or enhanced "corrected" parsing, particularly in the context of a select body of work, beyond the visual display is believed desirable and advantageous.

The human interaction with the sentence parsing correction system, more particularly, the displayed output of functional element 28 or the like, i.e., the human's moving the spatial positions of excons to new locations while preserving the original linear order of the text across and down the page in keeping with operations associated with functional element 48, in order to correct one or more initial machine-only outputs that had been imprecise or inaccurate creates a tactile and visual experience for the reader that strengthens the human reader's understanding and memory of the sentence content. It is intended to enhance or augment these particular interaction effects via provisions for supplementary visual, acoustic, and/or tactile effects via an output unit 53 operatively linking functional unit 55 or the like with optional system components C (FIG. 1). An especially advantageous setting for such enhancement is a study book or the like.

As a study book, the sentence parsing correction system can be readily adapted to hide or reveal, to varying degrees and using various user-chosen criteria, the excons and other differentiated display features of the sentences in/of the book (i.e., text). For example, in reviewing for a test, a student user might wish to review only those particular sentences that the student had made direct input on. The student could specify that all of the rest of the text, (i.e., the text that had not had any student interaction), be shown in a uniform, non-enhanced, word-wrap layout on the page. This variation would make the sentence parsing correction system-interaction sentences stand out more prominently, (e.g., in cascading format with excons around some or all of the sentence), on the display page. The student could also direct their study book to apply, for example, the study book's voice engine only to those sentences that had had human-based sentence parsing correction system interaction.

Having disclosed representative, non-limiting system enhancements that are notionally directed to the user experience, attention is next directed to representative, non-limiting system enhancements that are notionally directed to self-propagating system improvements, namely, those touching upon link/further link establishment in the context of the chain of system (machine) learning, for example, adaptive parsing. The issue of categorical priming for human supervision, instruction and guidance of machine learning systems follows.

New processes for machine learning, also termed, among other things, deep learning, neural networks, artificial intelligence, have enabled computer-based analyses to optimize their results independent of additional human input. Such machine learning can be especially effective in machine vision, voice recognition, and extraction of correlations between rare phenomena from large data sets. However, the fundamental approach to information structure extraction in these machine learning methods is based on probabilistic analyses of quantitative data, such as visual data captured by cameras or acoustic data of speech.

Natural language syntax, by contrast, is categorical and qualitative, not quantitative, information. While it is feasible to use probability and frequency analyses to predict categorical relationships between words, phrases and clauses in a sentence, the recursive structures in human language produce unexpected but real meanings that make human language potentially even more complex than the geometric and chromatic data in visual scenes or the acoustic data of recorded speech. Moreover, unlike voice recognition algorithms, including machine learning, which seek to identify what the actual spoken words were in a temporal recording of speech, the contemplated sentence parsing correction system begins with the words of the text already identified.

In addition, the identification of syntactic structure in a sentence in text form, even though the words themselves have been identified, nonetheless entails several challenges that are well recognized by experts in the field as very difficult for machine learning. One challenge is the high-dimensionality of syntax. In general, the complexity of informational structure extraction increases exponentially with each dimension of information in a system. In the case of natural language syntax, there are at least five dimensions: (1) the linear sequence of symbols; (2) the separation of words with spaces; (3) the combination of words into phrases, and of phrases into other phrases; (4) the combination of phrases into clauses; and, (5) the interwoven nesting of clauses within phrases and phrases within clauses, a nesting that must be resolved before all phrases in dimension three and clauses in dimension four can be identified.

Another challenge for machine learning systems in the extraction of syntax from natural language sentences is the phenomenon of long-range dependencies. This phenomenon is especially difficult when the high-dimensionality of syntax puts many other words and phrases between two words that have a direct syntactic relationship with each other; for example, when a long relative clause is used to modify the subject of a sentence, with the relative clause creating a long separation between the main subject and the main predicate of the sentence. The current inability of machine learning to master the complexities of natural language syntax is an especially desirably and advantageous utility of the sentence parsing correction system.

Part-and-parcel of contemplated categorical priming for human supervision, instruction and guidance of machine learning is dynamic human-machine collaboration. For instance, a human user of the sentence parsing correction system may identify a particular error in the initial parsing output, and may then move one or more of the excons to correct the parsing output. After correcting one particular error, the user could then send a command via input device 64/64' to have the machine "recalculate" the parsing of the remainder of the sentence, while preserving the localized syntactic inter-relationships that the human user had first specified with the first correction. In this way, the larger, global sentence parsing representation can take into account the human localized input, which may have other consequences on the interpretation of the remainder of the sentence, which the machine-only parsing engine may be able to attain accurately.

A further dynamic collaboration contemplates fusing graphical and voice-based sentence parsing correction system input and human-machine collaboration. As a human reads the initial machine-only parsed layout of a sentence in the initial set of excons, and, having recognized a machine-generated parsing error, the reader could, in addition to physically moving the spatial position of the excons, read the sentence aloud, twice as a further supplemental system input. First, the human's read-aloud behavior would deliberately emphasize certain inflections, pauses, volume, speed (i.e., a variety of prosodic dimensions of speech) to convey, as a form of "awkward" speech, the somewhat inaccurate syntactic interpretation that had been the machine-only initial parsing output. Second, in the human's second read-aloud of the sentence, before, during or after making spatial-position changes in the excon, the human reader can deliberately change the emphasis, volume, speed and/or pitch of their utterance, which can be an additional set of machine-analyzable voice-data associated with the text version of the sentence. With ongoing training, the computer will associate certain human elocutionary effects with certain patterns of excon movement, (e.g., with a longer pause after reading phrase X before the reading of phase Y, excon Y gets moved into excon x), and with ultimate hierarchical, text-based mark-up representation of the syntax of the phrase or sentence.

A still further dynamic collaboration contemplates human-user specific and domain specific sentence parsing correction system database enrichment. As the human-user reads and interacts with sentences, the human may recognize specialized terms that require special syntactic consideration. For example, if the human reader is also the author of a new book, and is using the sentence parsing correction system to review the book before publication, the human may recognize that, in the particular domain or topic that the book is about, certain multi-word terms ought to be analyzed as single units of meaning. An economist writing an economics textbook might, for instance, use the term "price control" in the text, and ultimately note that the initial machine-only parsing output in the sentence parsing correction system does not consistently parse these words as a single entity.

Using the excons, and via an input device, the reader/author could put "price" and "control" into a single excon, and designate that it needs to be processed as a noun or an adjective, but not a verb. The author/reader could then use the human-machine collaboration feature described earlier to have the entire textbook re-parsed to take into account this effect for this particular word-pair. The human author/reader could also specify that such word-combinations should only be processed as a single word within the domain of Economics, but not necessarily in all domains. The sentence parsing correction system would annotate the machine-readable text accordingly. Moreover, it also possible, of course, to have the sentence parsing correction system accept text-based modifications (e.g., removing, adding or changing words and punctuation) and the dynamic human-machine collaboration feature could then, upon request, parse and reparse the text with these editorial changes.

In yet a still further dynamic collaboration, the sentence parsing correction system is utilized in a crowd parsing context. With internet-based technologies, a particular human-reader's interactions with the excons of a sentence could be compared with the interactions that other readers of the same text have had. The individual reader could then be given instant feedback, such as "over 90 percent of readers of this sentence had the same syntactic interpretation of this sentence that you had," in verbal or graphic form. In this way, a human reader can also be scored for overall proficiency and reliability in their syntactic parsing interpretation skills. When crowd-sourcing analysis gives ambiguous results (e.g., a 50/50 split between two potential interpretations), the reliability scores of the human-interpreters can be used in the scoring. Similarly, "gold-standard" human system users can be included in this analysis.

In keeping with the heretofore described representative dynamic human-machine collaboration approaches relative to the analysis of a particular sentence or individual text, it is also possible to use the human-user's interactions with sentences in the sentence parsing correction system to help train machine-based parsing systems, and enable the machine to begin to learn independently. Already mentioned is the human-based identification, and the human-directed placement into a displayed excon, of multi-word terms that can be treated as a single term, either in all domains, or in specific domains. Machine-learning algorithms could also capture and analyze, across multiple user-sentence encounters, including crowd parsing groups of users, larger syntactic and semantic contexts in which these types of multi-word terms are identified.

For example, the term "price control" might be directly human-recognized, placed together in an excon, and then categorized as a single term. However, the machine-learning algorithm would further extract the various possible parts of speech, and case of these two words, and would then scan large corpora of texts looking for similar pairs based on these same parts of speech and case, and the machine-learning algorithm could further compare various contexts, throughout the large corpora, in which the newly identified pair has identical syntactic interactions with these comparable contexts. These analyses are not probabilistic, but are instead categorical.

For instance, the term "price control" has syntactic categories for each word in the pair (1 price=infinitive transitive verb/singular noun/adjective; 2 control=infinitive transitive verb/singular noun/adjective) that are also found in a newly machine-identified pair "police force." What enables the machine-learning algorithm to conclude that "police force" can also be added to a domain-contingent database of multi-word, single-function terms, is not merely the set of grammatical attributes of the words in the pair themselves, which like "price control" were: (1 police=infinitve transitive verb/singular noun/adjective; 2 force=infinitive transitive verb/singular noun/adjective), but, more important, is the machine's examination of larger corpora to evaluate the many various contexts in which "police force" is used. As in, (a) "The government imposes price control policies during a period of inflation" and, (b) "The city council recommends police force evaluations after such incidents." These comparable contexts, in which both "price control" and "police force" are both acting as single-term adjectives, being immediately preceded by an unambiguous transitive verb and immediately followed by a plural unambiguous noun not needing a determiner, enable the machine-learning algorithm to add "police force" to the multi-word single-term data-base for future parsing operations across new texts.

Rather than explicitly instructing the machine-learning algorithm, as was done for this illustration, on how to deduce such terms from particular contexts, the machine-learning system instead uses the human-users' excon interactions with "price control", and examines the categories of the content of the excon and of surrounding contexts in which the content is used, in the first human-interaction example, as well as other examples, with other users too, across the text corpora, and then independently identifies a variety of contexts, and then seeks similar multi-word terms and evaluates them and adds them to the data-base independently.

In summary, a core method of the contemplated sentence parsing correction system is to: (1) generate manipulatable and expandable graphical elements that have particular spatial and visual interrelationships that, in turn, are initially determined by machine-based parsing of the text contained by the graphical elements, and to then (2) capture and convert the human-based interactions with these graphical elements into additional machine-readable text and mark-up that can be usable for other machine-based text processes. With this core function, the examples above demonstrate that the sentence parsing correction system becomes much more than a parsed text/editor interface, instead, the sentence parsing correction system becomes an intuitive, visual conduit for dynamic human-machine collaboration in text analysis. The subject sentence parsing correction system creates a new reading and document-building format, with a wide variety of options for individual customization, multimodal inputs and outputs, and text editing. The sentence parsing correction system further mediates the fusion of graphical and prosodic structures for the analysis and representation of syntax, with the contemplated and described synta-graphic user interface further mediating and providing the structure needed to enrich parsing databases, facilitate crowd-based parsing consensus data, and provide human-based categorical priming and supervision of machine learning.

What has been described and illustrated herein are one or more preferred embodiments of a contemplated sentence parsing correction system, more particularly, a sentence parsing correction system adapted for intuitive, visual dynamic human-machine collaboration for text analysis. It should be readily appreciated that the heretofore described system, and/or specific system adaptations, may be readily altered, modified or even further adapted in keeping with the scope of the disclosed advantageous and desirable functionality, namely, the generation of manipulatable and expandable graphic elements that have particular spatial and visual interrelationships, initially established by machine based parsing of text within the graphical elements, with human user based interactions with the graphical elements thereafter capture and converted into additional machine-readable text and mark-up code usable for other machine-based processes. Moreover, the terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Finally, any headings utilized within the description are for convenience only and have no legal or limiting effect.

What is claimed is:

1. A system for improved sentence parsing wherein a machine generated parsing output, corresponding to a sentence characterized by components comprising a noun, a verb and a prepositional phrase and originating from a meta-tag listing of/for same, is adapted and subject to human user assessment and select human user input in furtherance of effectuating a modification to the adapted machine generated parsing output, the human user modified adapted machine generated parsing output thereafter converted into a correspondingly renewed meta-tag listing of meta-tags of the originating meta-tag listing and renewed machine parsing in furtherance of an adapted parsing functionality for the system, the system comprising a computer processor, a display device operatively linked thereto, and a human user action element to effectuate select user actions in relation to display objects of said display device, said computer processor characterized by functional units, a first functional unit establishing, in keeping with a preselect parsing algorithm, the machine generated parsing output corresponding to the sentence characterized by components comprising a noun, a verb and a prepositional phrase, the output characterized by an initial display on said display device, said initial display characterized by the text of the sentence arranged in original text order, and having, on successive lines, the noun, the verb, and prepositional phrase of the sentence with relative indentations specifying parsing relationships among parsed components, a second functional unit establishing an adapted initial display for display upon said display device, said adapted display characterized by unique expandable container images, each parsed component enclosed within a unique expandable container image of said unique expandable container images, each of said unique expandable container images of said adapted initial display subject to select human user input via said human user action element, said select human user input comprising selecting word combinations of a parsed sentence component enclosed within a unique expandable container image for enclosure within a further unique expandable container image, said word combinations thereby having a new and consistent treatment relative to re-parsing and/or subsequent parsing, the modification to the adapted machine generated parsing output thereby effectuated.

2. The system of claim 1 wherein said human user action element comprises a mouse.

3. The system of claim 1 wherein said human user action element comprises a trackball.

4. The system of claim 1 wherein said human user action element comprises a touch screen, said touch screen operatively united with said display device.

5. The system of claim 1 wherein said select human user input further comprises a drag and drop action.

6. The system of claim 1 wherein select human user input relative to a select expandable container image initiates a recalculated parsing of the sentence while preserving localized syntactic inter-relationships specified via said select human user input relative to a select expandable container image.

7. The system of claim 1 wherein said computer processor is further characterized by a third functional unit, said third functional unit establishing the correspondingly renewed meta-tag listing of meta-tags of the originating meta-tag listing.

8. The system of claim 1 further characterized by an input device operatively linked to one or more of said computer processor, said display device and said human user action element, said input device permitting select user formatting of a text characterized by the modified adapted machine generated parsing output, said text displayable upon said display device.

9. The system of claim 1 further characterized by an input device operatively linked to one or more of said computer processor, said display device and said human user action element, and an output device operatively linked to one or more of said computer processor, said display device and said human user action element, input to said input device activating said output device in furtherance of reinforcing the modification to the adapted machine generated parsing output.

10. The system of claim 1 further characterized by an output device operatively linked to one or more of said computer processor, said display device and said human user action element, said output device providing a supplementary user perceptible effect comprised of a visual, acoustic or tactile user perceptible effect, said supplementary user perceptible effect effectuated upon select human user input relative to a select expandable container image.

11. The system of claim 1 further characterized by a machine learning algorithm executable by said computer processor, said machine learning algorithm capturing and analyzing human user input relative to each of said unique expandable container images of said adapted initial display resulting in the modification to the adapted machine generated parsing output thereby effectuated.

12. A system for improved sentence parsing wherein a machine generated parsing output, corresponding to a sentence characterized by components comprising a noun, a verb and a prepositional phrase and originating from a meta-tag listing of/for same, is adapted and subject to human user assessment and select human user input in furtherance of effectuating a modification to the adapted machine generated parsing output, the human user modified adapted machine generated parsing output thereafter converted into a correspondingly renewed meta-tag listing of meta-tags of the originating meta-tag listing and renewed machine parsing in furtherance of an adapted parsing functionality for the system, the system comprising a computer processor, a display device operatively linked thereto, and a human user action element to effectuate select user actions in relation to display objects of said display device, said computer processor characterized by functional units, a first functional unit establishing, in keeping with a preselect parsing algorithm, the machine generated parsing output corresponding to the sentence characterized by components comprising a noun, a verb and a prepositional phrase, the output characterized by an initial display on said display device, said initial display characterized by the text of the sentence arranged in original text order, and having, on successive lines, the noun, the verb, and prepositional phrase of the sentence with relative indentations specifying parsing relationships among parsed components, a second functional unit establishing an adapted initial display for display upon said display device, said adapted display characterized by unique expandable container images, each parsed component enclosed within a unique expandable container image of said unique expandable container images, each of said unique expandable container images of said adapted initial display subject to select human user input via said human user action element, the modification to the adapted machine generated parsing output thereby effectuated, the system further characterized by an input device operatively linked to one or more of said computer processor, said display device and said human user action element, said input device permitting select human input comprised of select reading aloud a sentence intended for modification with a first vocal emphasis, and select re-reading aloud of the modified sentence with a second vocal emphasis, said first vocal emphasis and said second vocal emphasis being machine analyzable and correlatable with later encountered sentences of a text.

13. The system of claim 12 wherein said human user action element comprises a mouse.

14. The system of claim 12 wherein said human user action element comprises a trackball.

15. The system of claim 12 wherein said human user action element comprises a touch screen, said touch screen operatively united with said display device.

16. The system of claim 12 wherein said select human user input further comprises a drag and drop action.

17. The system of claim 12 wherein select human user input relative to a select expandable container image initiates a recalculated parsing of the sentence while preserving localized syntactic inter-relationships specified via said select human user input relative to a select expandable container image.

18. The system of claim 12 wherein said computer processor is further characterized by a third functional unit, said third functional unit establishing the correspondingly renewed meta-tag listing of meta-tags of the originating meta-tag listing.

19. The system of claim 12 further characterized by an input device operatively linked to one or more of said computer processor, said display device and said human user action element, said input device permitting select user formatting of a text characterized by the modified adapted machine generated parsing output, said text displayable upon said display device.

20. The system of claim 12 further characterized by an input device operatively linked to one or more of said computer processor, said display device and said human user action element, and an output device operatively linked to one or more of said computer processor, said display device and said human user action element, input to said input device activating said output device in furtherance of reinforcing the modification to the adapted machine generated parsing output.

21. The system of claim 12 further characterized by an output device operatively linked to one or more of said computer processor, said display device and said human user action element, said output device providing a supplementary user perceptible effect comprised of a visual, acoustic or tactile user perceptible effect, said supplementary user perceptible effect effectuated upon select human user input relative to a select expandable container image.

22. The system of claim 12 further characterized by a machine learning algorithm executable by said computer processor, said machine learning algorithm capturing and analyzing human user input relative to each of said unique expandable container images of said adapted initial display resulting in the modification to the adapted machine generated parsing output thereby effectuated.

* * * * *